(12) United States Patent
Haag et al.

(10) Patent No.: US 11,196,583 B2
(45) Date of Patent: Dec. 7, 2021

(54) METHOD AND SYSTEM FOR ESTABLISHING A SERVICE PATH IN A COMMUNICATIONS NETWORK

(71) Applicant: Deutsche Telekom AG, Bonn (DE)

(72) Inventors: Thomas Haag, Rodgau (DE);
Hans-Joerg Kolbe, Darmstadt (DE);
Carsten Michel, Hochheim (DE);
Wolfgang Hurst, Langen (DE); Adam Heiland, Karlsruhe (DE)

(73) Assignee: DEUTSCHE TELEKOM AG, Bonn (DE)

( * ) Notice: Subject to any disclaimer, the term of this patent is extended or adjusted under 35 U.S.C. 154(b) by 231 days.

(21) Appl. No.: 16/618,428

(22) PCT Filed: Jun. 12, 2018

(86) PCT No.: PCT/EP2018/065521
§ 371 (c)(1),
(2) Date: Dec. 2, 2019

(87) PCT Pub. No.: WO2018/229059
PCT Pub. Date: Dec. 20, 2018

(65) Prior Publication Data
US 2020/0099546 A1   Mar. 26, 2020

(30) Foreign Application Priority Data
Jun. 12, 2017 (EP) ..................................... 17175601

(51) Int. Cl.
*H04L 12/28* (2006.01)
*H04L 12/24* (2006.01)
(Continued)

(52) U.S. Cl.
CPC ...... *H04L 12/2856* (2013.01); *H04L 41/0806* (2013.01); *H04L 41/0896* (2013.01); *H04Q 3/0029* (2013.01); *H04Q 11/0478* (2013.01)

(58) Field of Classification Search
CPC ............. H04L 12/2856; H04L 41/0806; H04L 41/0896; H04Q 3/0029; H04Q 11/0478
See application file for complete search history.

(56) References Cited

U.S. PATENT DOCUMENTS 7,724,688 B2   5/2010   Mariko et al.
8,213,800 B1 *  7/2012   Liu ................... H04Q 11/0067
                                              398/115

(Continued)

FOREIGN PATENT DOCUMENTS

CN   101056310 A   10/2007
CN   105515772 A   4/2016

(Continued)

*Primary Examiner* — Walter J Divito
(74) *Attorney, Agent, or Firm* — Leydig, Voit & Mayer, Ltd.

(57) ABSTRACT

A method for establishment of a service path within the central office point of delivery within a broadband access network of a telecommunications network. The method to establish the service path includes: in a first step, identity information of the at least one network termination node is transmitted to the first line termination node, in a second step, subsequent to the first step, the identity information of the at least one network termination node is transmitted to the at least one repository node, and in a third step, subsequent to the second step, a first service edge node of the plurality of service edge nodes is selected or determined, based on the identity information of the at least one network termination node, and the service path for the at least one network termination node is thereby established.

14 Claims, 3 Drawing Sheets

(51) Int. Cl.
　　　*H04Q 3/00*　　　　(2006.01)
　　　*H04Q 11/04*　　　(2006.01)

(56) References Cited

U.S. PATENT DOCUMENTS

| | | | |
|---|---|---|---|
| 10,560,321 | B2 | 2/2020 | Ruobin |
| 11,044,203 | B2* | 6/2021 | Bosch ................... H04L 47/29 |
| 2007/0237159 | A1 | 10/2007 | Mariko et al. |
| 2008/0253381 | A1 | 10/2008 | Ward et al. |
| 2009/0049532 | A1 | 2/2009 | Hai et al. |
| 2009/0269063 | A1 | 10/2009 | Bernard et al. |
| 2013/0003740 | A1* | 1/2013 | Zheng ................ H04L 12/4633 370/392 |
| 2013/0235822 | A1 | 9/2013 | Christoph et al. |
| 2017/0093623 | A1 | 3/2017 | Ruobin |
| 2017/0208011 | A1* | 7/2017 | Bosch ................... H04L 47/25 |
| 2018/0124168 | A1* | 5/2018 | Danisik ............... H04L 41/0806 |
| 2018/0159796 | A1* | 6/2018 | Wang ............... H04N 21/64738 |

FOREIGN PATENT DOCUMENTS

| | | |
|---|---|---|
| EP | 02007063 A2 | 12/2008 |
| EP | 3101872 A1 | 12/2016 |
| EP | 3148112 A1 | 3/2017 |
| JP | 2002271365 A | 9/2002 |
| JP | 2004187282 A | 7/2004 |
| JP | 2007281980 A | 10/2007 |
| JP | 2018516511 A | 6/2018 |

\* cited by examiner

METHOD AND SYSTEM FOR ESTABLISHING A SERVICE PATH IN A COMMUNICATIONS NETWORK

CROSS-REFERENCE TO PRIOR APPLICATIONS

This application is a U.S. National Phase Application under 35 U.S.C. § 371 of International Application No. PCT/EP2018/065521, filed on Jun. 12, 2018, and claims benefit to European Patent Application No. EP 17175601.8, filed on Jun. 12, 2017. The International Application was published in English on Dec. 20, 2018 as WO 2018/229059 A1 under PCT Article 21(2).

FIELD

The present invention relates a method for improved and simplified operation and architecture of a central office point of delivery and/or for the establishment of a service path within the central office point of delivery, especially involving a stateless central office point of delivery configuration, within a broadband access network of a telecommunications network, wherein the central office point of delivery and/or the broadband access network comprises a controller node, at least one repository node and a plurality of line termination nodes.

Furthermore, the present invention relates to a telecommunications network for improved and simplified operation of a central office point of delivery and/or for the establishment of a service path within the central office point of delivery, especially involving a stateless central office point of delivery configuration, within a broadband access network of the telecommunications network.

Additionally, the present invention relates to a system for improved and simplified operation of a central office point of delivery and/or for the establishment of a service path within the central office point of delivery, especially involving a stateless central office point of delivery configuration, within a broadband access network of a telecommunications network.

Furthermore, the present invention relates to a repository node of a central office point of delivery of a telecommunications network or of a system.

BACKGROUND

The exchange of packetized information in broadband communication systems or telecommunications networks, both in fixed-line as in wireless communication systems (or fixed-line communication networks and mobile communication networks) has already grown dramatically and probably will also grow in the future due to the rapid spread of different data services in such communication networks.

The present invention generally relates to the area of aggregation networks linking remote or central access nodes to a backbone network or core network of the telecommunications network, e.g. broadband access network platforms such as 5G or CORD (Central Office Re-architected as a Data Center).

Typically in such architectures, multiple network termination ports are aggregated by an access node (e.g. a DSLAM (Digital Subscriber Line Access Multiplexer) device or an OLT (Optical Line Terminal) device) and interconnected to a subscriber termination device via a layer-2 infrastructure such as a datacenter fabric.

In today's broadband networks, an optical network terminal device (or network termination node) needs to be authenticated by an optical line terminal (or line termination node). This typically requires knowledge on device-specific information (basic credentials, usually a serial number) before the optical network terminal device (network termination node) gets connected. The network operator typically owns and provides the optical network terminal device (or network termination nodes) and thus knows the built-in credentials (such as identity information or hardware identity information or serial numbers, etc.) which are typically configured by network operator technicians at time of setup.

In order to serve the (regulatory) requirement of free choice of the used PON (passive optical network) or optical network terminals or home gateway devices by the customer, the network operators face the challenge of how to authenticate an unknown optical network terminal (or network termination node) that has either none of these built-in/pre-configured credentials or at least not having such built-in/pre-configured credentials that are trusted by the network operator.

A similar challenge arises in the context of a Fixed Wireless Access (FWA) or Wireless to the Home (WTTH) infrastructure. FWA and WTTH are hybrid technologies that provide a wireless communication bridge for the "last mile" between an optical fiber network and the end-user's premises. This can for example involve installing a radio cell in the vicinity of the user's premises (e.g. on a streetlamp), which provides an access point for wireless signals from an outdoor antenna on the premises of the user. As in the case of an unknown optical network terminal, a direct authentication of the termination node on the user's premises is prevented by the operator's lack of knowledge of a device-specific information such as built-in/pre-configured credentials.

SUMMARY

In an exemplary embodiment, the present invention provides a method for establishment of a service path within the central office point of delivery within a broadband access network of a telecommunications network. The central office point of delivery and/or the broadband access network comprises a controller node, at least one repository node and a plurality of line termination nodes. A first line termination node of the plurality of line termination nodes is connectable—using an access node port of the first line termination node—to at least one network termination node of a plurality of network termination nodes. The broadband access network or the central office point of delivery comprises a plurality of service edge nodes. Upon activation of the at least one network termination node—the service path is set up or is established within or traversing the central office point of delivery. The method to establish the service path comprises the following steps: in a first step, identity information of the at least one network termination node is transmitted to the first line termination node, in a second step, subsequent to the first step, the identity information of the at least one network termination node is transmitted to the at least one repository node, and in a third step, subsequent to the second step, a first service edge node of the plurality of service edge nodes is selected or determined, based on the identity information of the at least one network termination node, and the service path for the at least one network termination node is thereby established.

BRIEF DESCRIPTION OF THE DRAWINGS

Embodiments of the present invention will be described in even greater detail below based on the exemplary figures.

The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
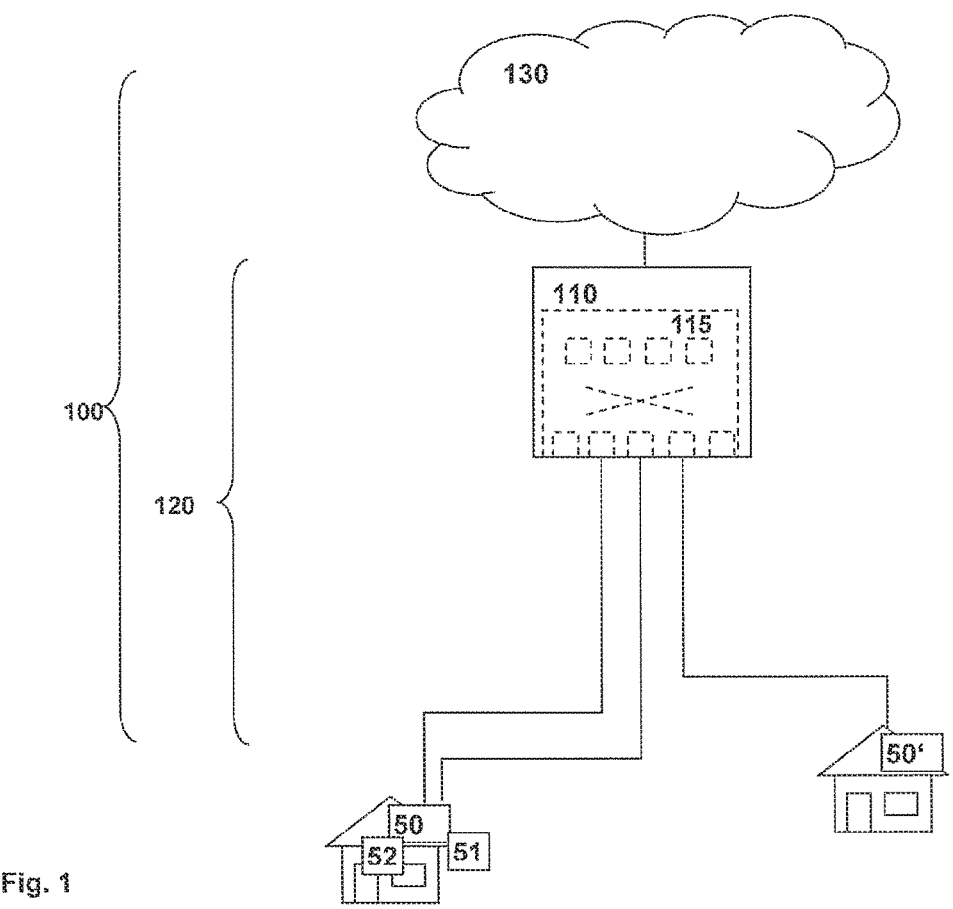
FIG. 1 schematically illustrates a telecommunications network according to the present invention, having a broadband access network with a central office point of delivery.

Exemplary embodiments of the present invention provide a technically simple, effective and cost effective solution for improved and simplified operation and architecture of a central office point of delivery and/or for the establishment of a service path within the central office point of delivery, especially involving a stateless central office point of delivery configuration, within a broadband access network of a telecommunications network, wherein the central office point of delivery and/or the broadband access network comprises a controller node, at least one repository node and a plurality of line termination nodes, wherein a specific line termination node of the plurality of line termination nodes is connectable—using an access node port of the specific line termination node—to one specific network termination node of a plurality of network termination nodes, wherein the broadband access network or the central office point of delivery comprises a plurality of service edge nodes, wherein—upon activation of the specific network termination node, being connected to the specific line termination node—the service path is set up or is established within or traversing the central office point of delivery. Exemplary embodiments of the present invention further provide a corresponding telecommunications network, a corresponding system, and a corresponding central office point of delivery.

Exemplary embodiment of the present invention provide a method for improved and simplified operation and architecture of a central office point of delivery and/or for the establishment of a service path within the central office point of delivery, especially involving a stateless central office point of delivery configuration, within a broadband access network of a telecommunications network, wherein the central office point of delivery and/or the broadband access network comprises a controller node, at least one repository node and a plurality of line termination nodes, wherein a specific line termination node of the plurality of line termination nodes is connectable—using an access node port of the specific line termination node—to one specific network termination node of a plurality of network termination nodes, wherein the broadband access network or the central office point of delivery comprises a plurality of service edge nodes, wherein—upon activation of the specific network termination node, being connected to the specific line termination node—the service path is set up or is established within or traversing the central office point of delivery, wherein the method to set up or to establish the service path comprises the following steps:

in a first step, identity information of the specific network termination node is transmitted to the specific line termination node, in a second step, subsequent to the first step, the identity information of the specific network termination node is transmitted to the repository node, in a third step, subsequent to the second step, a specific service edge node of the plurality of service edge nodes is selected or determined, based on the identity information of the specific network termination node, and thereby the service path for the specific network termination node being established. According to a preferred embodiment of the present invention, regarding the first step of the method, the specific service edge node of the plurality of service edge nodes is selected or determined by the controller node. In an especially preferred embodiment, regarding the second step of the method, the identity information of the specific network termination node is transmitted to the repository node via the controller node.

It is thereby advantageously possible according to the present invention to provide a solution to detect untrusted optical network terminal devices (or network termination nodes) in order to provide connectivity to a service edge in view to validate customer connectivity. Especially, it is advantageously possible according to the present invention, to detect unknown optical network terminal devices (or network termination nodes), to correlate the built-in but unknown identity information or hardware ID (especially a serial number or the like or another hardware identity information) with a customer session and path setup inside the (central office) point of delivery.

In conventionally known telecommunications networks—especially switching networks that are typically so-called SDN-based (software defined network-based) networks or switching networks (that typically provide the backbone of access PODs (central office points of delivery)—, an SDN (software defined network) controller takes care of the connectivity between different nodes of the central office point of delivery, such as, e.g., leaf and spine switches (or nodes). In conventionally known telecommunications networks, this configuration is typically done by source and destination identifiers (IDs or identity information) which provide (or realize) a mutual assignment between a specific optical network terminal device (or specific network termination node), on the one hand, and a service edge node, on the other hand. From a free choice of the used passive optical network (PON) components or optical network terminals results that the identities (or identity information) of optical network terminal devices (or network termination nodes) are unknown to the network operator (or the identities of the optical network terminal devices or network termination nodes are not under the control of the network operator); hence, in conventionally known telecommunications networks, extending such an assignment to a passive optical network-based (PON-based) access with a free choice of the used PON components or optical network terminals is not possible because a central office-based configuration control does not work sufficiently as either the relation of the identity information of the optical network terminal device (or of the network termination node) to layer-2 circuit ID (corresponding to a Line ID or line identification information) is missing, or, in the service edge node, the session correlation to the identity information of the optical network terminal device (or of the network termination node) cannot be performed.

Another problem in conventionally known telecommunications networks is the physically fixed assignment on layer-2 hand off ports towards wholesale partners. This typically forces a network operator to provide a single unchangeable handoff port at the service edge node (such as a Broadband Network Gateway (BNG)).

Especially, it is advantageously possible according to the present invention to avoid these drawbacks and to provide a flexible fabric setup (within the central office point of delivery) between optical line terminal devices (or line termination nodes) on the one hand, and layer-2 service edge nodes on the other hand, is provided.

Hence, according to the present invention, it is advantageously possible that a service path is established within the broadband access network—but especially within the central office point of delivery—between the specific network termination node, on the one hand, and the specific selected (or assigned) service edge node of the plurality of possible service edge nodes, on the other hand. According to the present invention, it is advantageously possible—by using the repository node within the broadband access network, especially within the central office point of delivery—that such a service path is setup or established within or traversing the central office point of delivery, upon activation of the specific network termination node (being connected to the specific line termination node), and by:
- transmitting, in a first step, the identity information of the specific network termination node to the specific line termination node,
- transmitting, in a second step, the identity information of the specific network termination node to the repository node, and
- selecting or determining, in a third step, a specific service edge node of the plurality of service edge nodes, based on the identity information of the specific network termination node.

Exemplary embodiments of the inventive method can also be implemented within a Fixed Wireless Access (FWA) or Wireless to the Home (WTTH) infrastructure, where the last mile between the optical fiber network and the termination node on the end-user's premises is spanned by a wireless connection. The standards governing such wireless communication are specified in IEEE 802.11. The frequency of the WiFi signal is in the 60 GHz range (corresponding to wavelengths in the millimeter range), in accordance with IEEE 802.11ad or 802.11ay. Such a connection via WiFi enables the provision of multigigabit services known from fixed line technology. The final goal is to provide fiber-optic connections all the way to the subscriber's home (Fiber To The Home or FTTH). WTTH technology can be considered as a transitional solution for the interim period. The radio cells installed for this purpose can also be used for local WiFi or as WiFi backhaul.

In order to effectively manage a plurality of autonomous access points, the corresponding management functions are performed by a designated controller (e.g. in the form of a so-called Split-MAC (media access control) Architecture). Such management functions do not play an integral role in the processing of frames on a radio channel and are therefore appropriately carried out by a central platform orchestrating many access points. Correspondingly, the access points become dependent on the controller for functions such as authentication of WiFi stations, management of security policies, selection of radio channels or configuration of power output. For the purpose of controlling dynamical connections in a leaf-spine environment the central controller has to be able to recognize termination points and to discover access points and their home units. In conventionally known telecommunications networks the connections are set up statically, under the control of an element management station (EMS). Such static connections are fixed and their attributes are not changed during the service deployment life cycle. In an SDN-based setting however, these connection attributes are managed dynamically and are modified during the life cycle.

The utilization of exemplary embodiments of the inventive method within the framework of such a wireless access technology provides a mechanism that allows service providers to perform dynamical resource management in a wireless domain. In this context the specific network termination node is typically a wireless station on the user's premises and the specific line termination node is typically an access point of the optical fiber network. The user can for example enter identity information of the specific network termination node in the form of line credentials at the terminal device connected to the specific line termination node or directly at the specific line termination node itself. This is preferably done during the initial configuration process of the specific line termination node. In a first step of exemplary embodiments of the inventive method, the identity information is wirelessly transmitted to the specific line termination node. In a second step, subsequent to the first step, the identity information of the specific network termination node is transmitted to a repository node. According to a preferred embodiment, the repository node comprises a local database that can be accessed by the controller node. It is furthermore preferred that this local database maps the identity information to a line ID, thereby completing the authentication process. In the third step, subsequent to the second step, a specific service edge node of the plurality of service edge nodes is selected or determined, based on the identity information of the specific network termination node. Through this process the service path for the specific network termination node is established.

The telecommunications network according to exemplary embodiments of the present invention might be a fixed-line telecommunications network or a mobile communication network but preferably is a telecommunications network having both aspects (or parts) of a fixed-line telecommunications network (or being a fixed-line telecommunications network in such parts) and aspects (or parts) of a mobile communication network (or being a mobile communication network in such parts); such networks are also known under the term fixed-mobile-convergence networks (FMC networks).

Furthermore, it is advantageously possible and preferred according to the present invention that the identity information of the specific network termination node is hardware identity information of the specific network termination node, especially a serial number of the specific network termination node.

Via the identity information of the specific network termination node being hardware identity information of the specific network termination node, especially a serial number of the specific network termination node, it is advantageously possible to easily identify the specific network termination node and/or distinguish different network termination nodes. According to a furthermore preferred embodiment, the identity information of the specific network termination node is hardware identity information of the specific network termination node such that the identity information is unique, especially universally unique.

Furthermore, and according to an alternative embodiment of the present invention, it is preferred that the repository node comprises or is able to access relevant pieces of information, especially the corresponding pieces of identity information, regarding all network termination nodes of the plurality of network termination nodes within the broadband access network or within the central office point of delivery, and especially identification information regarding the plurality of corresponding services paths, wherein the repository node especially comprises or is able to access one or a plurality of the following pieces of information:
the identity information of the network termination nodes, especially retrieved by a port status message,
identification information of an access node port of a line termination node, especially optical node unit identification information, especially retrieved by a port status message,
line identification information, especially provided by a line identification information server,
identification information of the corresponding service edge node.

Thereby, it is advantageously possible to provide for an identification of such optical network terminal devices or network termination nodes that are not under control of the network operator—hence that are in the first place unknown to the network operator.

According to a further preferred embodiment of the present invention, the central office point of delivery and/or the broadband access network comprises—besides the controller node, and the at least one repository node—an operations administration and management node or database, a platform control server node, a platform control server client node, wherein the platform control server client node is preferably located within the controller node.

Thereby, it is advantageously possible to easily and effectively realize exemplary embodiments of the inventive method of improved and simplified operation and architecture of a central office point of delivery, especially involving a stateless central office point of delivery configuration.

According to a further embodiment of the present invention, in a fourth step, subsequent to the second step and prior to the third step, line identification information is generated or provided—by a line identification information server, and in view of the identity information of the specific network termination node being transmitted to the repository node during the second step—, wherein especially during and/or subsequent to the fourth step, an infrastructure identification information is assigned to the specific network termination node.

By generating or providing the line identification information, by a line identification information server, in view of the identity information of the specific network termination node being transmitted to the repository node during the second step, it is advantageously possible to realize exemplary embodiments of the inventive method for the case of a session context (e.g. using a customer dial-in via a point-to-point-protocol (PPP), or dynamic host configuration protocol (DHCP), etc.).

According to still a further embodiment of the present invention, in a fifth step, subsequent to the second step and prior to the third step, bit stream access information and/or business port information is generated or provided in view of the identity information of the specific network termination node being transmitted to the repository node during the second step.

By generating or providing the bit stream access information and/or business port information in view of the identity information of the specific network termination node being transmitted to the repository node during the second step, it is advantageously possible to realize exemplary embodiments of the inventive method for the case of an access deployment without session context.

According to a further embodiment of the present invention, in a sixth step, subsequent to the third step, and upon deactivation of the specific network termination node, the service path of the specific network termination node is released within the repository node, wherein especially the deactivation event of the specific network termination node is recorded in an error history database node.

Thereby, it is advantageously possible to easily and effectively implement exemplary embodiments of the inventive method.

According to still a further embodiment of the present invention, in a seventh step, subsequent to the sixth step, and upon re-activation of the specific network termination node—being connected to the specific line termination node or to another specific line termination node—the service path or another service path is set up or is established within or traversing the central office point of delivery.

Thereby, it is advantageously possible to easily and effectively implement exemplary embodiments of the inventive method.

Furthermore, the present invention relates to a telecommunications network for improved and simplified operation of a central office point of delivery and/or for the establishment of a service path within the central office point of delivery, especially involving a stateless central office point of delivery configuration, within a broadband access network of the telecommunications network,
wherein the central office point of delivery and/or the broadband access network comprises a controller node, at least one repository node and a plurality of line termination nodes, wherein a specific line termination node of the plurality of line termination nodes is connectable—using an access node port of the specific line termination node—to one specific network termination node of a plurality of network termination nodes,
wherein the broadband access network or the central office point of delivery comprises a plurality of service edge nodes,
wherein—upon activation of the specific network termination node, being connected to the specific line termination node—the service path is set up or is established within or traversing the central office point of delivery, wherein the telecommunications network, in order to set up or to establish the service path, is configured such that:
identity information of the specific network termination node is transmitted to the specific line termination node,
the identity information of the specific network termination node is transmitted to the repository node,
a specific service edge node of the plurality of service edge nodes is selected or determined, based on the identity information of the specific network termination node, and thereby the service path for the specific network termination node being established.

Furthermore, the present invention relates to a system for improved and simplified operation of a central office point of delivery and/or for the establishment of a service path within the central office point of delivery, especially involving a stateless central office point of delivery configuration, within a broadband access network of a telecommunications network, the system comprising the telecommunications network and the central office point of delivery, wherein the central office point of delivery and/or the broadband access network comprises a controller node, at least one repository node and a plurality of line termination nodes, wherein a specific line termination node of the plurality of line termination nodes is connectable—using an access node port of the specific line termination node—to one specific network termination node of a plurality of network termination nodes, wherein the broadband access network or the central office point of delivery comprises a plurality of service edge nodes, wherein—upon activation of the specific network termination node, being connected to the specific line termination node—the service path is set up or is established within or traversing the central office point of delivery, wherein the system, in order to set up or to establish the service path, is configured such that:

identity information of the specific network termination node is transmitted to the specific line termination node, the identity information of the specific network termination node is transmitted to the repository node, a specific service edge node of the plurality of service edge nodes is selected or determined, based on the identity information of the specific network termination node, and thereby the service path for the specific network termination node being established.

According to preferred embodiments of the present invention—especially with respect to exemplary embodiments of the inventive telecommunications network and/or with respect to exemplary embodiments of the inventive system—, the identity information of the specific network termination node is hardware identity information of the specific network termination node, especially a serial number of the specific network termination node.

Furthermore according to preferred embodiments of the present invention—especially with respect to exemplary embodiments of the inventive telecommunications network and/or with respect to exemplary embodiments of the inventive system—, the repository node comprises or is able to access relevant pieces of information, especially the corresponding pieces of identity information, regarding all network termination nodes of the plurality of network termination nodes within the broadband access network or within the central office point of delivery, and especially identification information regarding the plurality of corresponding services paths, wherein the repository node especially comprises or is able to access one or a plurality of the following pieces of information:

the identity information of the network termination nodes, especially retrieved by a port status message, identification information of an access node port of a line termination node, especially optical node unit identification information, especially retrieved by a port status message, line identification information, especially provided by a line identification information server, identification information of the corresponding service edge node.

Additionally, the present invention relates to a repository node of a central office point of delivery of a telecommunications network or of a system and/or to the use of a repository node of a central office point of delivery in a telecommunications network or in a system or in a method.

Still additionally, the present invention relates to a program comprising computer readable program code which, when executed on a computer and/or on a central office point of delivery and/or on a repository node of a central office point of delivery, or in part on a central office point of delivery and/or in part on a repository node of the central office point of delivery, causes the computer and/or the central office point of delivery and/or the repository node of the central office point of delivery to perform exemplary embodiments of the inventive method.

Furthermore, the present invention relates to a computer program product for improved and simplified operation of a central office point of delivery and/or for the establishment of a service path within the central office point of delivery, especially involving a stateless central office point of delivery configuration, within a broadband access network of a telecommunications network, the computer program product comprising a computer program stored on a storage medium, the computer program comprising program code which, when executed on a computer and/or on a central office point of delivery and/or on a repository node of a central office point of delivery, or in part on a central office point of delivery and/or in part on a repository node of the central office point of delivery, causes the computer and/or the central office point of delivery and/or the repository node of the central office point of delivery to perform exemplary embodiments of the inventive method.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to exemplary embodiments and with reference to certain drawings but the invention is not limited thereto but only by the claims. The drawings described are illustrative and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a telecommunications network 100 according to the present invention is schematically shown, having—preferably—at least a fixed line part. A mobile (or cellular) part might be present as well, as part of the telecommunications network 100. User equipments or client devices 51, 52 are connected to the telecommunications network 100 via a broadband access network 120. The telecommunications network 100 comprises a backbone network 130 and, especially as part of the broadband access network 120, at least one logical or physical central office point of delivery 110 that is preferably realized within a data center and that is especially handling different access requirements, especially different access possibilities, of the client devices 51, 52 to network functionalities provided by the telecommunications network 100 or via the telecommunications network 100. The client devices 51, 52 are typically connected to the logical or physical central office point of delivery 110 via a customer premises equipment device 50, 50' or via a customer premises equipment functionality that might be built in the client devices 51, 52. Preferably but not necessarily, the central office point of delivery 110 comprises a switching fabric 115 comprising a plurality of spine network nodes and typically also a plurality of leaf network nodes which are not explicitly represented in FIG. 1.

Figure 2:
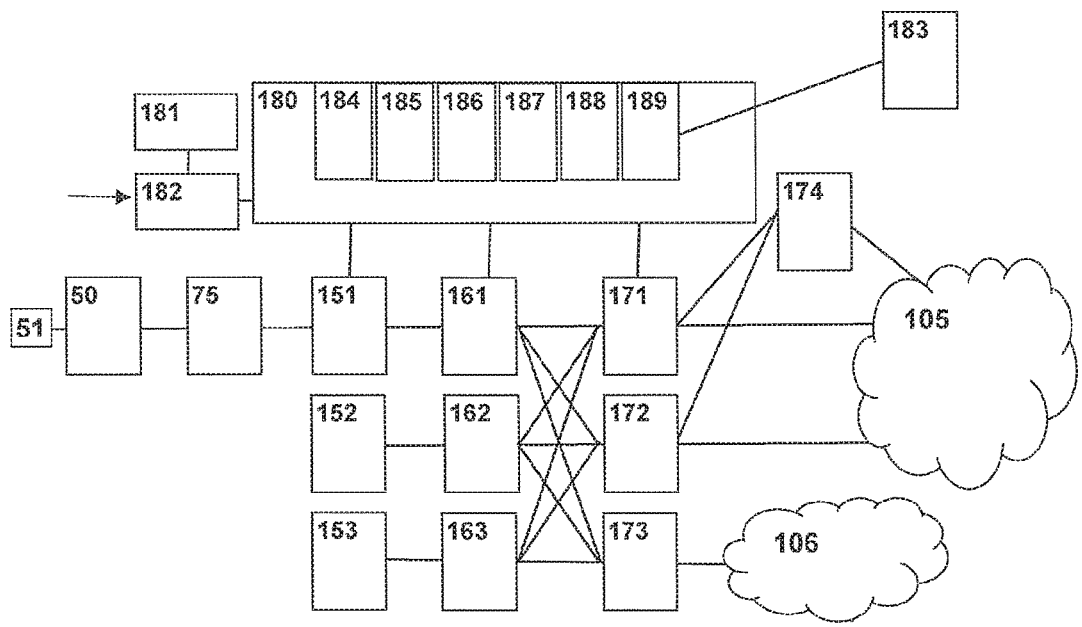
FIG. 2 schematically illustrates a part of a broadband access network of a telecommunications network with a central office point of delivery and a plurality of service edge nodes.

FIG. 2 schematically illustrates a central office point of delivery 110 as part of a broadband access network 120 of a telecommunications network 100, wherein the represented part of the telecommunications network 100 comprises—besides a controller node 180 and at least one repository node 182—a plurality of line termination nodes 151, 152, 153. Typically, each of the line termination nodes 151, 152, 153 has one or a plurality of access node ports. In the example represented in FIG. 2, the broadband access network 120 comprises three line termination nodes, a first line termination node 151, a second line termination node 152, and a third line termination node 153. The line termination nodes 151, 152, 153 might be provided to support different access technologies to a home gateway device or customer premises equipment device 50. In the exemplary embodiment shown in FIG. 2, the first line termination node 151 is taken as a line termination node supporting to be connected to an optical network, especially a passive optical network (PON), typically a so-called optical line terminal (OLT) or optical line terminal device. In such a situation, a client device 51 is connected to the telecommunications network 100 (i.e. to the first (or also called specific) line termination node 151) via the customer premises equipment device 50 (or home gateway device) and a network termination node 75. The functionality of the customer premises equipment device 50 (or home gateway device) and the functionality of the network termination node 75 might also be integrated in one device or "box". Even the functionality of the client device 51, the functionality of the customer premises equipment device 50 (or home gateway device) and the functionality of the network termination node 75 might be integrated in one device or "box". Nevertheless, these functionalities are represented in FIG. 2 as separated functionalities. In FIG. 2, only one home gateway device (or customer premises equipment device 50) (i.e. a specific customer premises equipment), and only one client device 51, and only one network termination node 75 (i.e. a specific network termination node) are shown. However, also the second and/or third line termination nodes 152, 153 might be connected to corresponding network termination nodes and customer premises equipments.

In the context of the present invention, in order to separate the "specific" or considered entities from the other entities of the same kind within the broadband access network 120, the first line termination node 151 is also called the specific line termination node 151, the network termination node 75 connected to the first line termination node 151 is also called the specific network termination node 75, and the customer premises equipment device 50 connected to the specific network termination node 75 is also called the specific customer premises equipment.

In case of the line termination nodes 151, 152, 153 having a plurality of access node ports, also a plurality of network termination nodes are able to be connected to one line termination node 151, 152, 153 and/or (in case that a network termination node has a plurality of ports also a plurality of customer premises equipments are able to be connected to one network termination node.

According to the present invention, a method for improved and simplified operation of a central office point of delivery 110 within a broadband access network 120 of a telecommunications network 100 as well as a corresponding architecture of a central office point of delivery 110 is provided. Especially, this serves to establish a service path within the central office point of delivery 110 such that, especially, a stateless configuration of a central office point of delivery 110 is possible according to the present invention.

The central office point of delivery 110 and/or the broadband access network 120 comprises a controller node 180, at least one repository node 182, a plurality of line termination nodes 151, 152, 153, and a plurality of service edge nodes 171, 172, 173, 174, wherein a specific line termination node 151 of the plurality of line termination nodes is connectable—using an access node port of the specific line termination node 151—to typically only one specific network termination node 75 (of a plurality of network termination nodes that are, however, not shown in FIG. 2).

According to the present invention, upon activation of the specific network termination node 75, being connected to the specific line termination node 151—the service path is set up or is established within or traversing the central office point of delivery 110, wherein the method to set up or to establish the service path comprises the following steps:

in a first step, identity information of the specific network termination node 75 is transmitted to the specific line termination node 151, in a second step, subsequent to the first step, the identity information of the specific network termination node 75 is transmitted to the repository node 182, in a third step, subsequent to the second step, a specific service edge node 171 of the plurality of service edge nodes 171, 172, 173, 174 is selected or determined, based on the identity information of the specific network termination node 75, and thereby the service path for the specific network termination node 75 being established.

Hence, FIG. 2 schematically shows a typical setup of a central office point of delivery 110. The specific customer premises equipment device 50 (or specific home gateway device) is connected via the specific optical network terminal (or the specific network termination node 75) and the specific optical line terminal (OLT MAC) (or the specific line termination node 151) to a leaf switch 161 (of a plurality of leaf switches 161, 162, 163) which is dual-homed at a plurality of spine switches. In the exemplary embodiment shown in FIG. 2, it is assumed that the plurality of spine switches also have a functionality of a service edge or a service edge user plane function or functionality (SE_U), especially for plain internet access built-in. However, the spine switch functionality might also be separated from the service edge functionality and vice versa, i.e. the service edge function or functionality may as well reside inside a different node in the central office point of delivery (than the spine switch functionality). However, reference signs 171, 172, 173, 174 refer to service edge nodes, and in case that the service edge functionality is separated from the spine switch functionality (or corresponding nodes are separated), an additional layer of network nodes are present between the leaf switches 161, 162, 163, and the service edge nodes 171, 172, 173, 174. A service edge node 173, used for a bit stream access (BSA-SE-U) is assumed to be the layer-2 handoff for Layer-2 bitstream access which does not require IP routing capabilities. The service edge node 173 can be accessed by third party service providers 106 via Layer-2 Bitstream with fixed port assignment and the service edge nodes 171, 172 and 174 are accessible by third party service providers 105 via plain internet access. The controller or controller node 180 for the access domain—which controls the central office point of delivery 110—has an access domain repository or repository node 182 (so-called A4 repository) which holds all devices within the passive optical network, including the connected optical network terminal devices (network termination nodes) and/or home gateway devices.

A service edge control plane 188 (or service edge control plane node) is shown as residing in the controller node 180, however, according to the present invention, it is also possible that the service edge control plane 188 (or service edge control plane node) is located separately from the controller node 180.

Besides the repository node 182, a database for alarms and anomalies is shown. This holds the history even in case of that the A4 repository (or repository node 182) already lost the session context (of a connection session) due to session termination.

At the controller node 180, typically applications or functionalities like an optical network terminal (ONT) authentication application or functionality 184, and/or a vOLTHA functionality and/or a fabric agent (FN-C) functionality 185 are located that control the configuration and management of related devices.

For communication towards a policy server RP (Radius Proxy), a packet flow switch (PFS) client 189 or PFS client functionality takes care. A PFS functionality or PFS node 183 corresponds to a platform control which is or corresponds to an AAA (authentication, authorization, and accounting) and Policy Control Server. This platform device receives session initiation requests usually by BNGs which is part of the communication of the central office point of delivery 110. Furthermore, the PFS node 183 is the policy controller providing access profile settings based on policies rules and decisions. This information is sent to central office point of delivery 110 in order to configure at the service edge nodes 171, 172, 173, 174 (SE-U) service related parameters.

For users and services based on PPPoE (point-to-point-protocol over Ethernet), user name and password and optionally Line ID will be taken for authentication.

For users and services without user session identification the pre-configuration of the optical network terminal serial number (i.e. the identity information of the network termination node) is needed. This is done by a business-to-business (B2B) interface, shown via an arrow on the left hand side of FIG. 2. In that case, the wholesale or business partner provides a serial number information which is stored in the A4 repository, i.e. the repository node 182. If an optical network terminal (or network termination node) (GK/L2BSA) comes up (i.e. is activated), its serial number will be authenticated against the preconfigured value and policies are set accordingly.

Figure 3:
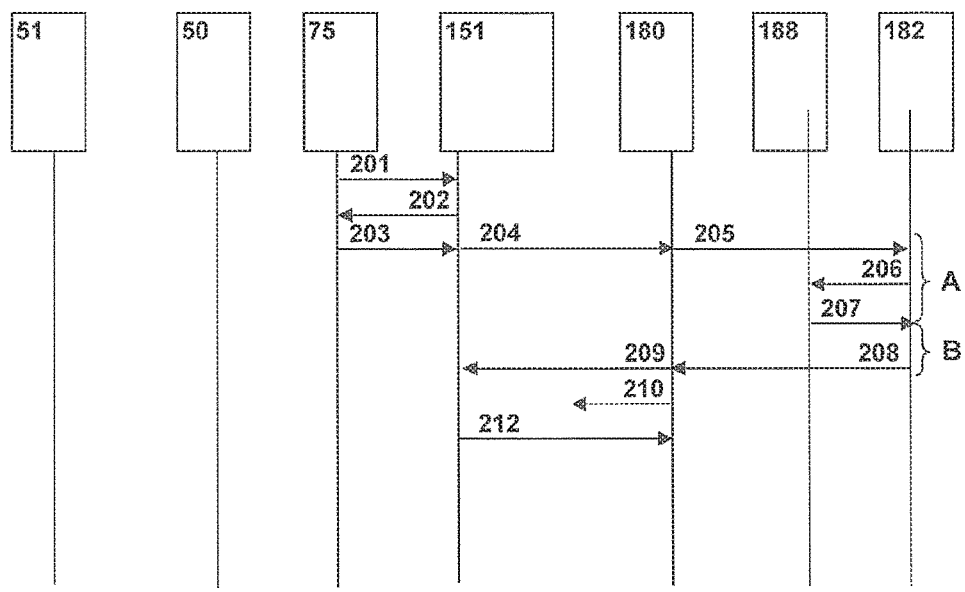
FIG. 3 schematically illustrates a communication diagram relating to a network attachment process of an unknown (or at least previously unknown) optical network terminal (or network termination node).

In FIG. 3, a communication diagram relating to exemplary embodiments of the inventive network attachment process of an unknown (or at least previously unknown) optical network terminal (or network termination node 75) is schematically shown: a network attachment process of an unknown optical network terminal (or network termination node 75) by an optical line terminal (or line termination node 151), reporting the serial number as identification towards the controller node 180 which triggers the A4 repository (repository node 182) to generate a context by storing the just learned serial number as well as an optical line terminal identifier as physical port (corresponding to the PON tree or PON tree information). The PON port is assigned based on the optical network terminal ID (i.e. typically the serial number of the network termination node 75) and the port ID of the corresponding optical line terminal (or line termination node 151). Also, the SE-U (i.e. the service edge node 171 is identified by its own identifier. In case of the existence of multiple service edge nodes 171, 172, 173 (SE-U), the operator determine a predefined SE-U. The controller node 180 now provides connectivity setup (set pseudo wire (PW), S-tag, leaf/spine) between PON Port and the service edge node 171 (SE-U).

Typically, the following processing steps occur:

first processing step 201: initializing from the network termination node 75 to the optical line terminal (or line termination node 151)

second processing step 202: response (PLOAM/ONU (Physical Layer Operations, Administration and Maintenance/Optical Network Unit) ID) from optical line terminal (or line termination node 151) to optical network terminal (or network termination node 75)

third processing step 203, 204: optical network terminal (or network termination node 75) sends its serial number and PON tree id (Registration ID) where it appeared to optical line terminal (or line termination node 151), optical line terminal (or line termination node 151) forwards this, including optical line terminal ID (or line termination node identifier information) to the controller node 180 fourth processing step 205: controller function or controller node 180 sends request to the repository node 182, including {the serial number, the optical line terminal ID, and the ID of the PON tree (PON_TREE ID or Registration ID)} fifth processing step: the A4-repository (or repository node 182) creates an entry; in case an optical network terminal (or network termination node 75) detaches from an optical line terminal (or line termination node 151), its entry will be deleted in the repository node 182 as defined by a sub-procedure; the same is true in case that an optical line terminal "dies" (or fails or reboots—then for all entries).

sixth processing step 206: the repository node 182 (especially immediately) requests a LineID (or line identification information) from a central backend system (line identification (LineID) information server 188), hereinafter also denoted as LineID information server 188; in a processing step 207, the LineID is provided, by the LineID information server 188 to the repository node 182.

seventh processing step: the repository node 182 chooses autonomously a PW ID (pseudo wire identifier) and an S-Tag (further identifier) for the optical line terminal (or line termination node 151); the repository node 182 typically keeps the entries of the used PW IDs (pseudo wire IDs) and S-Tags)

eighth processing step 208: the repository node 182 sends the assigned PW ID and S-Tag information to the controller node 180 ninth processing step 209: the controller node 180 instructs the optical line terminal (or line termination node 151) to map the identifier information of the network termination node 75 (especially the serial number), and thus implicitly the internal cross-connect, to S-Tag and PW ID.

tenth processing step 210: the controller node 180 chooses the service edge 171 where the subscriber (i.e. the customer premises equipment device 50) should terminate. This can be, e.g., based on load-balancing decisions or pre-configured serial number mappings for enterprise customers.

As a result, a bidirectional layer-2 connectivity between the optical network terminal (or the network termination node 75) and the service edge node 171 is established, uniquely identified by the serial number that the network has learned via this process.

In a first part A of the processing steps, the optical network terminal gets notified by serial number, at A4 Repository. The optical network terminal requests a unique Line ID. In a second part B of the processing steps, after Line ID assignment, an infrastructure ID is assigned which will be valid as long as the optical network terminal belongs to the service.

Anomalies:

If an ONT fails, the OLT will notify this and send a termination message (e.g. port down notification) towards the controller. In that case the controller will release the whole connection between ONT and SE-U. if the ONT comes in operation again, it will repeat the first to tenth processing step again.

If an OLT fails or get out of operation (e.g. due to loss of power), the controller detects the loss of connectivity towards the OLT and terminates all port set ups belonging to that particularly OLT.

ONT Ser. Number Spoofing:

Typically, a loss of ONT/OLT lead to a port down notification at controller. Due to port down all user set ups in the fabric are terminated. Even in case of changing an ONT and moving it to another PON Tree causes a port-down and port-up event with a new request information. So, the use of a duplicated serial number in regularly operation is prevented.

In case of a faked serial number or doubled number by accident, a serial number can only be registered once. If a doubled serial number may occur, the controller receives a deny because of an already existing entry in the A4 repository. But this event will also cause a log in the OAM-database 181 which is persistent.

Figure 4:
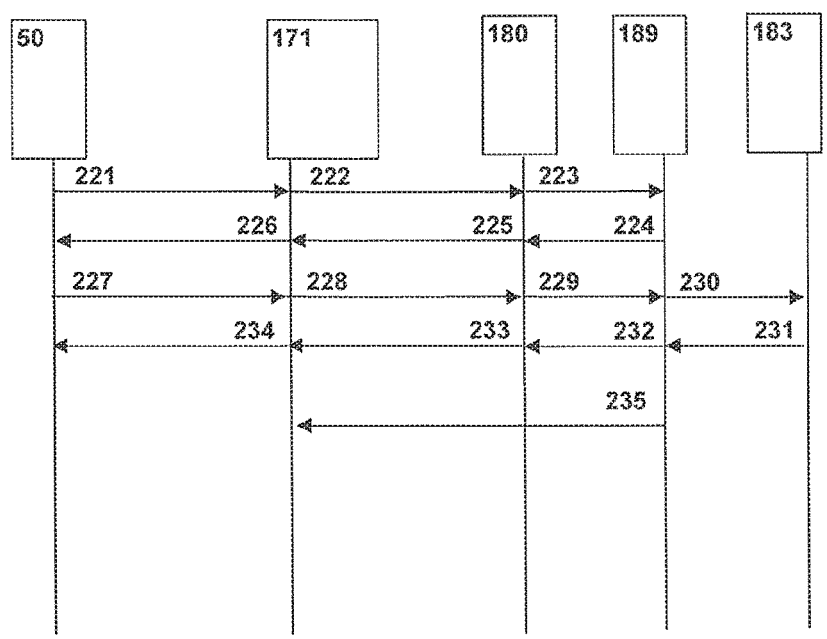
FIG. 4 schematically illustrates a communication diagram relating to a user session identification.

FIG. 4 schematically illustrates a communication diagram relating to a user session identification.

User Session Identification:

Scenario 1: Access deployment with session context (e.g. customer dial in via PPP. DHCP etc.); the following processing step apply:

first processing step 227: The customer sends a PPP session via HGW towards service edge node 171.

second processing step 228, 229: SE-U (service edge node 171) forwards the request to PFS client 189 which acts as a proxy towards platform policy controller PFS 183.

third processing step 230: PFS 183 checks user credentials (UN, password, Line ID) and provides a response (processing step 231) with access accept or deny and include if accepted the product specific profile information towards the PFS client 189 (further processing steps 232, 233, 234 to transmit the information to the home gateway device/customer premises equipment device 50)

fourth processing step 235: the PFS client 189 takes this information and sets the appropriate service configuration (i.e. the Service Profile ID is set at the service edge node 171) received by the profile information.

In case of missing Line ID, PFS 183 is checking on UN/password only; in case of Line ID existent, PFS 183 will check both.

Scenario 2: Access deployment without session context

In case that no PPP dial in is expected, the service creation, SE selection, profile setting is done by ONT HW ID e.g. serial number only. This applies to bit stream access directing to SE3-U for wholesale. Selected ports for business products are directed to e.g. SE2.

The following processing step need to be passed:

1) ONT sends it serial number and pon tree id where it appeared to OLT, OLT forwards including OLT ID to Controller 2) CF sends request to Repository the {serial_numberIOLTIDIPON TREE ID}

3) The A4-repository creates an entry. Note: in case an ONT detaches from an OLT its entry will be deleted in the repository as defined by a sub-procedure, same if an OLT dies/reboots (then for all entries).

4) Controller checks if serial number is already known and if SE ID is preconfigured. This may be e.g. SE3-U for Wholesale, or SE2 for Business 5) The repository chooses autonomously a PW ID and an S-Tag for the OLT. (Note it keeps the entries of the used PW IDs and S-Tag)

6) The repository sends the assigned PW ID and S-Tag information to the controller 7) The controller instructs the OLT to map serial number (and thus implicitly the internal cross-connect) to S-TaglP-WID.

User Session Identification and Fabric Redirect:

Considering regularly setup the connection of an ONT is terminated at a predefined SE-U which is a default SE-U. For certain reasons e.g. product related special SE-U it is necessary to redirect the connection e.g. from SE-Ull to SEA-Ul 2. This occur manly if the ONT session is established and based on user authentication the SE changes. In that case the controller triggers a redirect between OLT-SEl I to OLT-SE12 for that particular port.

Figures 5, 6:
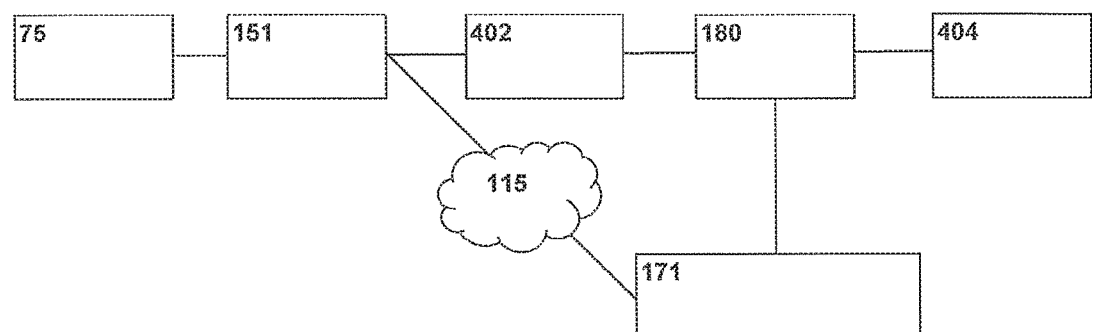
FIG. 5 schematically illustrates an example of an entry of the repository node, the entry being related to an unknown (or at least previously unknown) optical network terminal (or network termination node).
FIG. 6 schematically illustrates an example of a Fixed Wireless Access (FWA) or Wireless to the Home (WTTH) infrastructure performing a network attachment process of an unknown (or at least previously unknown) network termination node.

FIG. 5 schematically illustrates an example of an entry of the repository node 182, the entry being related to an unknown (or at least previously unknown) optical network terminal (or network termination node) in the context of the switching fabric.

According to FIG. 5, the entry of the repository node 182 especially comprises at least part of the following components 301, 302, 303, 304, 305, 306, 307, and 308:

component 301: The serial number of the optical network terminal; this component typically being retrieved by port status message;

component 302: The optical line terminal port/ONU ID; this component typically being retrieved by port status message;

component 303: The access context (random); this component typically being set by controller node;

component 304: The Line ID; this component typically being set from Line ID server; component 305: Service Edge (node) ID; this component typically being set by controller node, either a) default, or b) based on service group ID;

component 306: The ANP/PW (pseudo wire); this component typically being set by OLT/port and SE ID;

component 307: The Service Group ID; this component typically being an ID for classification towards which SE;

component 308: Service ID name; this component typically being set by PFS/controller updates A4 repository.

The present invention especially addresses the following points, directed to a manly connectionless operation of a central office point of delivery 110 (in case of a port-up being detected, a connection to a service edge node 171, 172, 173, 174 is switched only).

A) The Port Up Event of the ONT triggers the set up of path in Switching fabric
B) ONT's Ser. No. determines the context of the connection between ONT-OLT MAC-SE
C) The A4 repository is the "brain" of the POD which holds all information about ONTs and their status (serial number, ONU ID, OLT ID etc. examples see table 1 & 2)
D) Each Port up event leads to a controller request which enables a connection to a default SE which is pre-determined by operator POD setup. (It could also be possible to enable multiple. The controller assigns them according to a distribution rule which is either load-dependent or operator pre-configured.)
E) information for L2-BSA access ports will be set up by provisioning interface. Ser. No./Provider will be pre-assigned in A4 repository, based on POD performs set up to L2 service edge (e.g. SE3).
F) information Business ports (w/o PPP) will be set up by provisioning interface. Ser. No./Provider will be configured, based on POD performing set up either of legacy BNG or other SE.
G) For Business ports With PPP the SE selection is based on LineID/UN/password
H) In case of that ONTs lose power the port down message release the context in the A4 repository respectively the context of connectivity.
I) The A4 error history database holds persistent the former status or period.
J) After powering up again (With same ONT or changed ONT the setup starts again Additionally, the following points are addressed by the present invention:
A) The Port Up Event of the ONT controls setup of a path (stateless) in switching fabric
B) ONT's Ser. No. determines the context of the connection between ONT-OLT MAC-SE
C) The A4 repository node stores relevant information of the central office point of delivery 110, which holds all information about ONTs and their status
D) Each Pon-up event leads to a controller request which enables a connection to a default SE which is pre-determined by operator POD setup, but it could also be possible to enable multiple service edge nodes. The controller assigns them according to a distribution rule which is typically either load-dependent or operator pre-configured.

FIG. 6 shows an example of a Fixed Wireless Access (FWA) or Wireless to the Home (WTTH) infrastructure performing a network attachment process of an unknown (or at least previously unknown) network termination node 75. In this example, the network termination node 75 is a wireless station on the user's premises. The wireless communication between the access point 151 of the optical fiber network and the network termination node 75 on the user's premises serves as a bridge for the last mile of service delivery. In data center based access network structures SDN related technologies are increasingly applied. One way of implementing such an SDN-based approach is to set up an abstraction layer between the controller application 180 and the access point 151. In the depicted example a virtual hardware abstraction component 402 mediates between the hardware devices of the access point 151 and the PON management system which is itself agnostic with regard to the specific details of the access point 151. On its southbound side (i.e. towards the access point 151) the virtual hardware abstraction component 402 communicates with the access point 151 via protocols, such as for example Extensible Authentication Protocol (EAP) and Control And Provisioning of Wireless Access Points (CAPWAP). On its north bound side (towards the controller application 180) the virtual hardware abstraction component 402 provides a set of interfaces which allow interaction with the management system of the passive optical network. An example for such an interface is an OpenFlow Representational State Transfer Application Programming Interface (REST API). For the attachment process in a WTTH environment, the virtual hardware abstraction component 402 can be extended by including an event handling function that forwards the attachment request to the controller application 180. The controller application 180 serves as an EAP authenticator whose functionalities are extended in compliance with 802.1X. Necessary port notifications with parameters such as port up/down, net data rate, bit error rates etc. for dynamical channel behavior are transmitted to the controller 180 via a port notification client through push/pull procedures in an acceptable reporting interval and with an acceptable amount of reporting messages. This mechanism for WiFi access nodes in an SDN-based approach solves the problem of attaching an unknown network termination node 75 in a WTTH environment through the use of an access controller, making an SDN approach for WTTH according to 802.11 (WiFi) technology viable. With this approach the authentication mechanism for access points and stations is carried out in a uniform way.

For attachment of an unknown network termination node 75, the end user configures the network termination node 75 with line credentials. The network termination node 75 transmits the line credentials wirelessly to the access point 151, for example as part of an Extensible Authentication Protocol over Local Area Network (EAPOL) authentication request. The access point (e.g. a lightweight access point) forwards the line credentials to the controller application 180 via the virtual hardware abstraction component 402. The controller application 180 can be for example implemented on an SDN controller platform. The controller application 180 determines the line ID associated with the line credentials by querying a local database and subsequently completes the EAP authentication. The controller application 180 furthermore configures the switching fabric 115 in such a way that the user is able to connect to a specific service edge node 171 (or a wholesale partner of the network provider). After authentication is completed the user's router connects to the service edge node 171, for example by using Point-to-Point Protocol over Ethernet (PPPoE). The controller application 180 also performs Authentication, Authorization and Accounting (AAA) after Operations Support Systems (OSS) provisioning. In this capacity the controller application 180 mediates between the specific service edge node 171 and the AAA system 404, communicating to both via Remote Authentication Dial-In User Service (RADIUS). When the service edge node 171 sends an AAA request to the AAA system 404, the controller application 180 inserts the line ID associated with the network termination node 75 on the user's premises.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for establishment of a service path within the central office point of delivery within a broadband access network of a telecommunications network,
    wherein the central office point of delivery and/or the broadband access network comprises a controller node, at least one repository node and a plurality of line termination nodes, wherein a first line termination node of the plurality of line termination nodes is connectable—using an access node port of the first line termination node—to at least one network termination node of a plurality of network termination nodes,
    wherein the broadband access network or the central office point of delivery comprises a plurality of service edge nodes,
    wherein—upon activation of the at least one network termination node—the service path is set up or is established within or traversing the central office point of delivery, wherein the method to establish the service path comprises the following steps:
        in a first step, identity information of the at least one network termination node is transmitted to the first line termination node,
        in a second step, subsequent to the first step, the identity information of the at least one network termination node is transmitted to the at least one repository node, and
        in a third step, subsequent to the second step, a first service edge node of the plurality of service edge nodes is selected or determined, based on the identity information of the at least one network termination node, and the service path for the at least one network termination node is thereby established.

2. The method according to claim 1, wherein the identity information of the at least one network termination node is a hardware identity information of the at least one network termination node.

3. The method according to claim 1, wherein the repository node comprises or is able to access relevant pieces of information regarding all network termination nodes of the plurality of network termination nodes within the broadband access network or within the central office point of delivery, and wherein the repository node comprises or is able to access one or a plurality of the following pieces of information:
    the identity information of the network termination nodes,
    identification information of an access node port of a line termination node,
    line identification information, or
    identification information of the corresponding service edge node.

4. The method according to claim 1, wherein the central office point of delivery and/or the broadband access network comprises—besides the controller node, and the at least one repository node—an operations administration and management node or database, a platform control server node, and a platform control server client node.

5. The method according to claim 1, wherein in a fourth step, subsequent to the second step and prior to the third step, line identification information is generated or provided—by a line identification information server, and in view of the identity information of the at least one network termination node transmitted to the repository node during the second step.

6. The method according to claim 1, wherein in a fifth step, subsequent to the second step and prior to the third step, bit stream access information and/or business port information is generated or provided in view of the identity information of the at least one network termination node transmitted to the repository node during the second step.

7. The method according to claim 1, wherein, in a sixth step, subsequent to the third step, and upon deactivation of the at least one network termination node, the service path of the at least one network termination node is released within the repository node.

8. The method according to claim 7, wherein, in a seventh step, subsequent to the sixth step, and upon re-activation of the at least one network termination node—being connected to the first line termination node or to another specific line termination node—the service path or another service path is set up or is established within or traversing the central office point of delivery.

9. The method according to claim 1, wherein the identity information of the at least one network termination node is transmitted from the at least one network termination node to the first line termination node via a wireless communication channel.

10. The method according to claim 1, wherein the central office point of delivery and/or the broadband access network comprises a virtual hardware abstraction component that mediates between the first line termination node and the controller node by passing the identity information of the at least one network termination node from the at least one network termination node to the first line termination node.

11. A telecommunications network for establishment of a service path within the central office point of delivery within a broadband access network of the telecommunications network,
    wherein the central office point of delivery and/or the broadband access network comprises a controller node, at least one repository node and a plurality of line termination nodes, wherein a first line termination node of the plurality of line termination nodes is connectable—using an access node port of the first line termination node—to at least one network termination node of a plurality of network termination nodes,
    wherein the broadband access network or the central office point of delivery comprises a plurality of service edge nodes,
    wherein—upon activation of the at least one network termination node—the service path is set up or is established within or traversing the central office point of delivery, wherein the telecommunications network, in order to establish the service path, is configured such that:

identity information of the at least one network termination node is transmitted to the first line termination node, the identity information of the at least one network termination node is transmitted to the repository node, a first service edge node of the plurality of service edge nodes is selected or determined, based on the identity information of the at least one network termination node, and the service path for the at least one network termination node is thereby established.

12. A system for establishment of a service path within the central office point of delivery within a broadband access network of a telecommunications network, the system comprising:

the telecommunications network; and the central office point of delivery;

wherein the central office point of delivery and/or the broadband access network comprises a controller node, at least one repository node and a plurality of line termination node, wherein a first line termination node of the plurality of line termination nodes is connectable—using an access node port of the first line termination node—to at least one network termination node of a plurality of network termination nodes;

wherein the broadband access network or the central office point of delivery comprises a plurality of service edge nodes;

wherein—upon activation of the at least one network termination node—the service path is set up or is established within or traversing the central office point of delivery, wherein the system, in order to establish the service path, is configured such that:

identity information of the at least one network termination node is transmitted to the first line termination node, the identity information of the at least one network termination node is transmitted to the repository node, a first service edge node of the plurality of service edge nodes is selected or determined, based on the identity information of the at least one network termination node, and the service path for the at least one network termination node is thereby established.

13. The system according to claim 12, further comprising: a repository node.

14. A non-transitory computer-readable medium having processor-executable instructions stored thereon that, when executed, perform a method, for establishment of a service path within the central office point of delivery within a broadband access network of a telecommunications network, according to claim 1.

* * * * *